US011333494B1

(12) United States Patent
McGinity

(10) Patent No.: US 11,333,494 B1
(45) Date of Patent: May 17, 2022

(54) MOUNTING SYSTEM FOR ELECTRICAL BOXES

(71) Applicant: Mike G. McGinity, Bermuda Dunes, CA (US)

(72) Inventor: Mike G. McGinity, Bermuda Dunes, CA (US)

( * ) Notice: Subject to any disclaimer, the term of this patent is extended or adjusted under 35 U.S.C. 154(b) by 0 days.

(21) Appl. No.: 16/934,634

(22) Filed: Jul. 21, 2020

Related U.S. Application Data

(60) Provisional application No. 62/923,402, filed on Oct. 18, 2019.

(51) Int. Cl.
*H02G 3/10* (2006.01)
*G01C 9/28* (2006.01)
*H02B 1/30* (2006.01)

(52) U.S. Cl.
CPC ............. *G01C 9/28* (2013.01); *H02B 1/306* (2013.01); *H02G 3/10* (2013.01)

(58) Field of Classification Search
CPC  H02G 3/08; H02G 3/081; H02G 3/10; H02G 3/121; H02G 3/123; H02G 3/125; H02G 3/126; H02B 1/306; H02B 1/30; H02B 1/32; H02B 1/34; H02B 1/46; H02B 1/48; G01C 9/28; G01C 9/26
USPC ........... 174/50, 480, 481, 53, 57, 58, 66, 67; 220/3.2–3.9, 4.02; 248/906, 343; 33/528, DIG. 10
See application file for complete search history.

(56) References Cited

U.S. PATENT DOCUMENTS

| | | | | |
|---|---|---|---|---|
| 1,583,474 A | * | 5/1926 | Kruse | H02G 3/126 248/218.4 |
| 1,592,990 A | * | 7/1926 | Raquette | H02G 3/126 220/3.92 |
| 1,756,361 A | * | 4/1930 | Johnson | H02G 3/126 220/3.4 |
| 1,982,957 A | * | 12/1934 | Knell | H02G 3/126 220/3.9 |
| 2,023,083 A | * | 12/1935 | Knell | H02G 3/126 220/3.9 |
| 5,114,105 A | * | 5/1992 | Young | H02G 3/126 248/27.1 |
| 5,222,303 A | | 6/1993 | Jardine | |
| 5,361,509 A | | 11/1994 | Wheeler, Sr. et al. | |
| 5,813,130 A | | 9/1998 | MacDowell | |
| 6,223,445 B1 | * | 5/2001 | Schuette, Jr. | B25H 7/04 33/528 |
| 7,373,730 B2 | | 5/2008 | Murphy | |

(Continued)

FOREIGN PATENT DOCUMENTS

CA      2590486 A1   11/2007

*Primary Examiner* — Angel R Estrada
(74) *Attorney, Agent, or Firm* — Kelly & Kelley, LLP

(57) ABSTRACT

A system and leveling device for installing an electrical box or ring on a wall stud, and a process for installation using the same. The leveling device has a generally planar elongated substrate having a horizontal bubble level on a front face and positioning pins on a rear face. The positioning pins are configured for insertion into gang screw holes on the electrical box or ring. The system includes cross-stud braces for spanning the distance between adjacent wall studs. The electrical box or ring has pass-through slots to receive the cross-stud braces so that the electrical box or ring can be leveled using the leveling device prior to attaching the cross-stud braces to the wall studs.

13 Claims, 18 Drawing Sheets

(56) References Cited

U.S. PATENT DOCUMENTS

| | | | |
|---|---|---|---|
| 7,434,326 B2 | 10/2008 | Gifford | |
| 7,511,218 B2 * | 3/2009 | Kearney | H02G 3/12 174/66 |
| 8,099,878 B2 * | 1/2012 | Guzallis | H02G 1/00 33/528 |
| 8,250,773 B1 * | 8/2012 | Shotey | H02G 3/00 33/528 |
| 8,261,926 B2 * | 9/2012 | Bradley | H02G 3/121 220/241 |
| 9,010,696 B2 * | 4/2015 | Siddiqui | F16L 3/24 248/65 |
| 10,012,366 B2 * | 7/2018 | Belmonte | F21V 21/048 |
| 10,807,406 B2 * | 10/2020 | Francis | G01V 3/08 |
| 2002/0184778 A1 | 12/2002 | Yrazabal | |
| 2010/0095543 A1 * | 4/2010 | Inthavong | H02G 1/00 33/528 |
| 2020/0096664 A1 | 3/2020 | Hornby | |

\* cited by examiner

MOUNTING SYSTEM FOR ELECTRICAL BOXES

RELATED APPLICATION

This application claims the benefit of U.S. Provisional Patent Application No. 62/923,402, filed on Oct. 18, 2019.

BACKGROUND OF THE INVENTION

The present invention is directed to a mounting system for use in the installation of electrical boxes. Specifically, the system includes a leveling device to directly and accurately indicate the degree of horizontal and/or vertical level of the mounting holes in electrical junction boxes, electrical rough-in rings, and electrical mud rings. The system also includes elements to facilitate installation of the electrical boxes either directly on a wall stud or between wall studs.

Prior art systems for installing electrical boxes and measuring the degree of levelness in such installation rely on indirect measurements. Specifically, installers would rely on the underlying stud or cross member being level and appropriate adjustments, i.e., shims or spacers, to compensate for a lack of level installation. In addition, installers would also measure the whether the external walls of a particular electrical box were level.

Unfortunately, such prior art measurements would ignore whether the actual mounting holes in the electrical box are level. By mounting holes, the present application refers to the threaded openings in an electrical box that are configured to receive and secure the electrical outlet, switch, or other component installed in the electrical box. Since it is these mounting holes that determine whether the installed component will appear level after installation, it is important that these mounting holes be properly leveled. During manufacture of such electrical boxes, the mounting holes may be incorrectly aligned or they may be subsequently deformed during transportation. Such incorrect alignment or subsequent deformation may lead to an installation of the electrical box such that the mounting holes are not properly leveled.

Accordingly, there is a need for a leveling system that more reliably allows for level installation of electrical boxes such that the mounting holes are properly leveled for the desired installation. The present invention fulfills these needs and provides other related advantages.

SUMMARY OF THE INVENTION

The purpose of the system and leveling device is to allow for easier leveling of an electrical junction box or ring. A standard electrical junction box or ring has two screw holes that allow for screws to hold an electrical component, i.e., a finish plug, trim jack, or similar component, in place. The two screw holes on an electrical junction box or ring must be level to ensure that the electrical component that is installed will be level on the finished surface.

The leveling device has horizontal and vertical bubble levels installed on the face of the device. The horizontal and vertical level device offers leveling options for either horizontal or vertical installation of an electrical box or ring. The device may have a single leveling device that is pivotable between a horizontal or vertical position, or it may be a square level that is capable of indicating horizontal and vertical leveling without pivoting. The leveling device has two pins extending from the rear surface, i.e., opposite the leveling face, that are intended to insert into gang screw holes on the electrical box or ring, just as the screws for an electrical component would be installed.

The pins may come in various forms, including smooth, ridged, threaded, rotatable, removable, etc. The smooth or ridged pins are configured for easy insertion and removal from the gang screw holes on the boxes or rings. The threaded or rotatable pins are configured for selectively secured attachment to the gang screw holes on the boxes or rings. Once the pins are inserted into the gang screw holes, the level will be in place just as a plug, jack, or other electrical component. With the leveling device held in place, this would allow the installer to use both hands to install and fix the box or ring while properly level.

The system and leveling device offers a much improved and easier method of installing and leveling electrical boxes or rings, when comparted to typical leveling devices. With a typical level, the installer must use one hand to hold the level straight, while only having the other hand to simultaneously hold and secure the box or ring. Using a typical level can also be difficult as some boxes or rings do not have straight, square, or plumb surfaces from which to measure horizontal or vertical level. The leveling device inserted into the gang screw holes solves these problems, simplifies, and makes more accurate the process of leveling and installing an electrical box or ring.

The present invention is directed to a leveling device for use in installing electrical boxes and rings. The leveling device has a substrate with a generally planar elongated shape with a front surface and a rear surface. A bubble level device is attached to the front surface. A pair of positioning pins extends from the rear surface, wherein the pins are disposed proximate to opposite ends of an elongated dimension of the substrate and configured to be inserted into gang screw holes on the electrical boxes and rings.

The bubble level device has at a first bubble level disposed perpendicular to the elongated dimension of the substrate. The bubble level device further has a second bubble level disposed parallel to the elongated dimension of the substrate. The bubble level device may be mounted on a pivoting platform, configured to adjust the bubble level device between a perpendicular or parallel orientation relative to the elongated dimension of the substrate. The pair of positioning pins may be threaded and rotatably attached to the substrate. The pair of positioning pins may be selectively removable from the substrate and replaceable.

A system for installing an electrical box or ring between two adjacent wall studs includes the leveling device as described above. The system also includes an electrical box or ring having a flange disposed around a perimeter thereof. A first pass-through slot in the flange is on a first side of the electrical box or ring. A second pass-through slot in the flange is on a second side of the electrical box or ring opposite the first side. A first cross-stud brace is configured to slidingly extend through the first pass-through slot and has attachment slots at opposite ends thereof with each attachment slot configured for fastening to one of the two adjacent wall studs. A second cross-stud brace is configured to slidingly extend through the second pass-through slot and has attachment slots at opposite ends thereof with each attachment slot configured for fastening to one of the two adjacent wall studs.

The system may include a first set screw in the flange, whereby the first cross-stud brace is fixed in position relative to the electrical box or ring. A second set screw may be included in the flange, whereby the second cross-stud brace is fixed in position relative to the electrical box or ring. The first pass-through slot may have a partially open back and the second pass-through slot may have a partially open back.

A process for installing an electrical box or ring to a wall stud includes providing a leveling device as described above. The pair of positioning pins on the leveling device are inserted into a pair of gang holes on the electrical box or ring. The bubble level device is positioned such that it is perpendicular to a vertical axis extending between the pair of gang holes. The electrical box or ring is attached to the wall stud in a position where the bubble level device indicates that the vertical axis is perpendicular to a structural horizontal. The leveling device is removed from the electrical box or ring.

The step of attaching the electrical box or ring to the wall stud includes securing a first attachment support on the electrical box or ring to the wall stud. The bubble level device is measured so as to determine that the vertical axis is perpendicular to the structural horizontal. A second attachment support on the electrical box or ring is secured to the wall stud while the vertical axis is perpendicular to the structural horizontal.

The attaching step further includes inserting a first cross-stud brace into a first pass-through slot in a flange on a first side of the electrical box or ring and inserting a second cross-stud brace into a second pass-through in a flange on a second side of the electrical box or ring. The attaching also includes securing a first end of the first cross-stud brace to the wall stud, and measuring the bubble level device so as to determine that the vertical axis is perpendicular to the structural horizontal. A second end of the first cross-stud brace is attached to an adjacent wall stud while the vertical axis is perpendicular to the structural horizontal. The first end and second ends of the second cross-stud brace are attached to the wall stud and adjacent wall stud.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
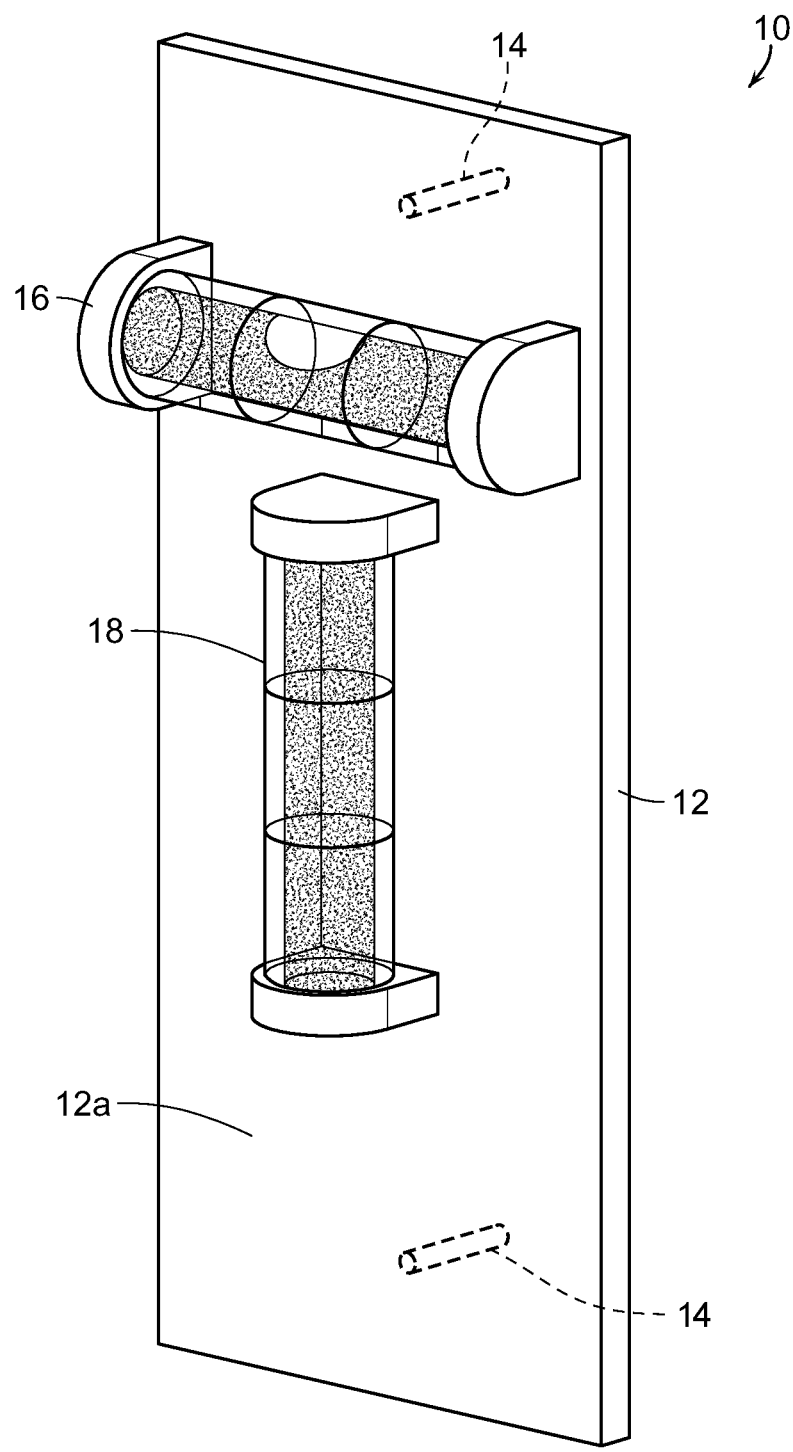
FIG. 1 is a front perspective view of a preferred embodiment of the leveling device for the mounting system of the present invention.

The present invention is directed to a leveling system for use in the installation of electrical boxes. Specifically, the leveling system includes one or more components: a leveling device, generally referred to by reference numeral 10; an electrical ring, generally referred to by reference numeral 30; an electrical box, generally referred to by reference numeral 40; and cross-stud bars or braces, generally referred to by reference numeral 50. The box 30 and ring 40 may be plastic, metal, or other common material used in electrical systems. The boxes 30 or other closed back housings are used for standard electrical voltages or high voltage systems. The rings 40 or other open back housings are used for low voltage systems.

Figure 2:
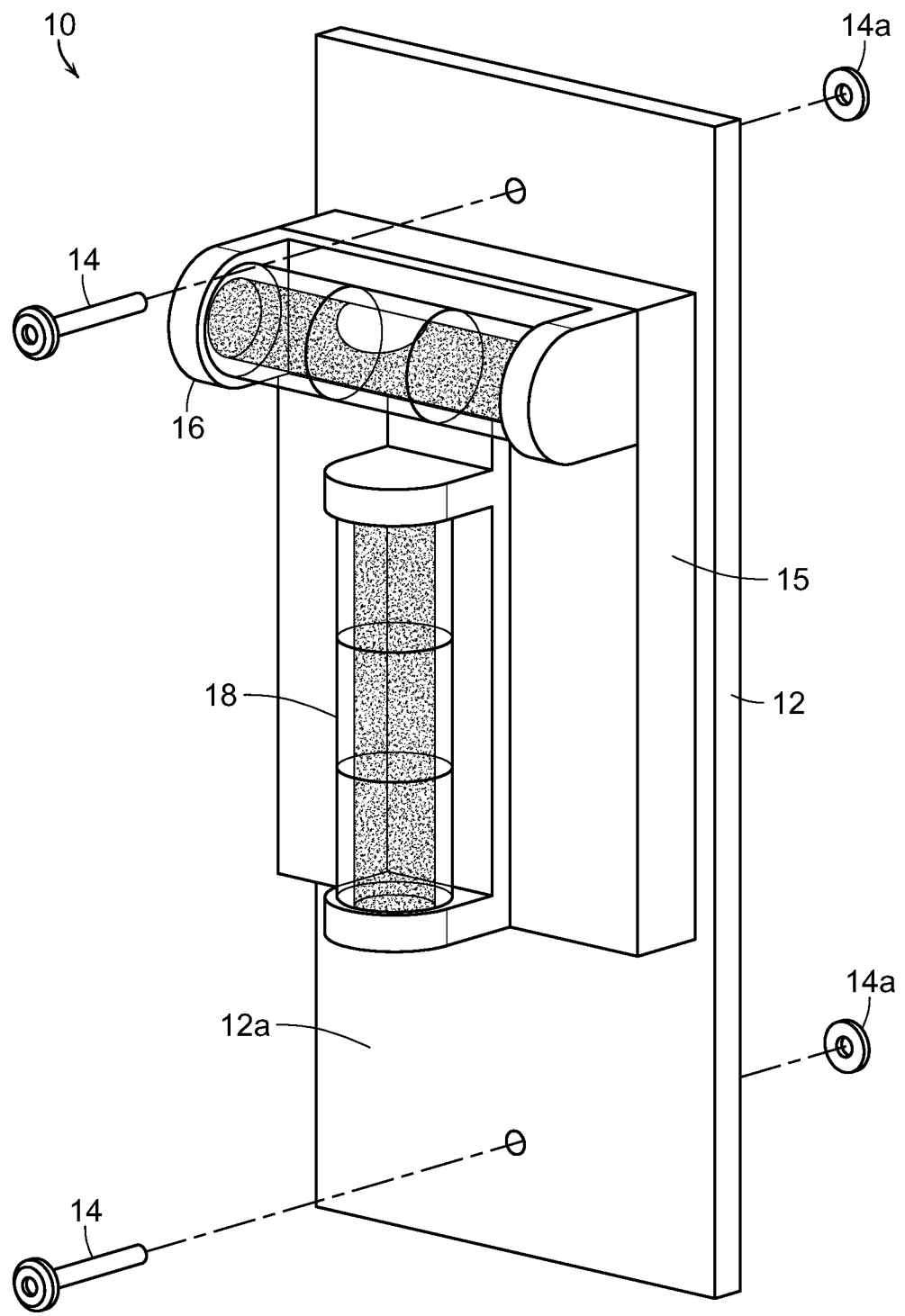
FIG. 2 is a front perspective view of an alternate preferred embodiment of the leveling device for the mounting system of the present invention.
Figure 3:
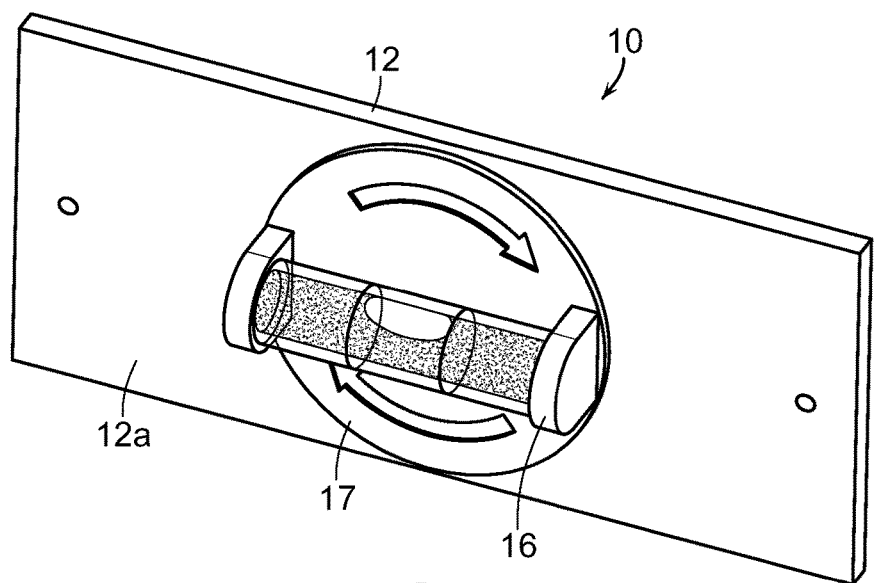
FIG. 3 is a front perspective view of an alternate preferred embodiment of the leveling device for the mounting system of the present invention.
Figure 4:
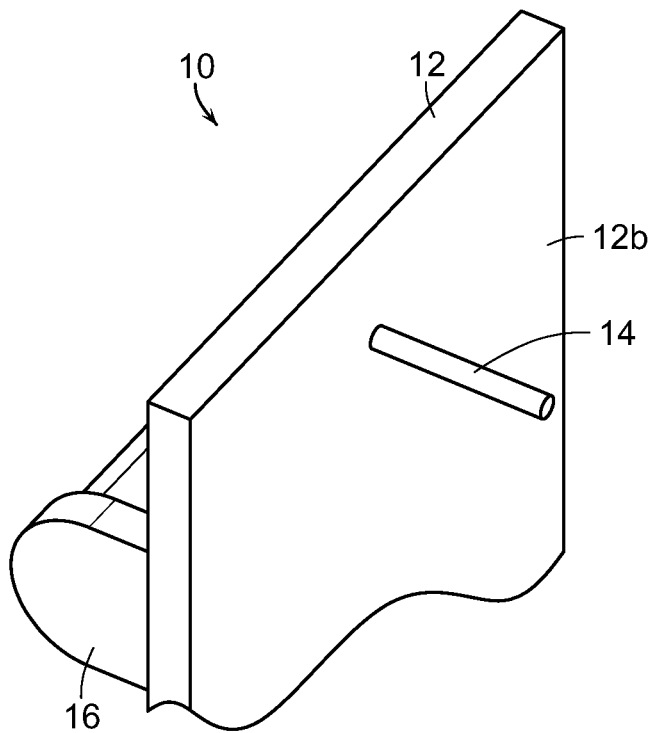
FIG. 4 is a partial cut-away rear perspective view of a preferred embodiment of a mounting post for the mounting system of the present invention.
Figure 4A:
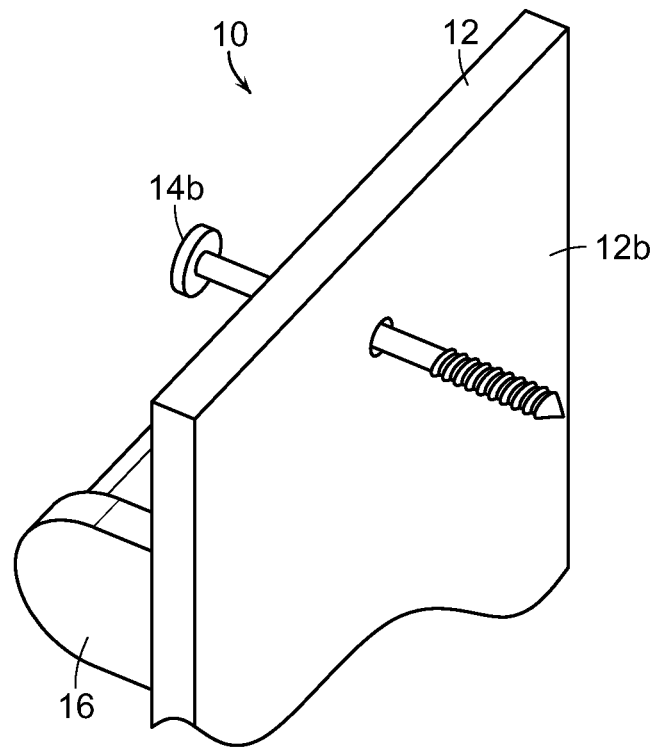
FIG. 4A is a partial cut-away rear perspective view of an alternate preferred embodiment of a mounting post on the leveling device of the present invention.

FIGS. 1 through 4A illustrate various embodiments of the leveling device 10. The leveling device 10 generally consists of a substrate 12 that is generally elongated and preferably rectangular, but may be provided in another shape. The substrate 12 has a front surface 12a and a rear surface 12b. The device 10 includes a pair of positioning posts 14 that protrude from the rear surface 12b, preferably disposed at opposite ends of the elongated substrate 12. The positioning posts 14 are configured to be inserted into securing holes on an electrical container as described more fully below and are preferably fixed on the substrate 12 (FIG. 4). As shown in FIG. 2, the positioning posts 14 may be selectively removable from the substrate 12 as by a securing nut 14a, or may be completely removable (FIG. 4A) and include a threaded tip 14b configured for threaded engagement with the securing holes as described more fully below.

The front surface 12a includes at least a first one bubble level 16 disposed transverse or perpendicular to the elongated shape of the substrate 12, i.e., horizontal orientation. More specifically, the bubble level 16 is preferably perpendicular to a line extending between the positioning posts 14. The device 10 may include a second bubble level 18 that is oriented perpendicular to the first bubble level 16 (FIG. 1), i.e., vertical orientation. When including both bubble levels 16, 18, the device 10 allows for both horizontal and vertical alignments as described more fully below.

Figure 3A:
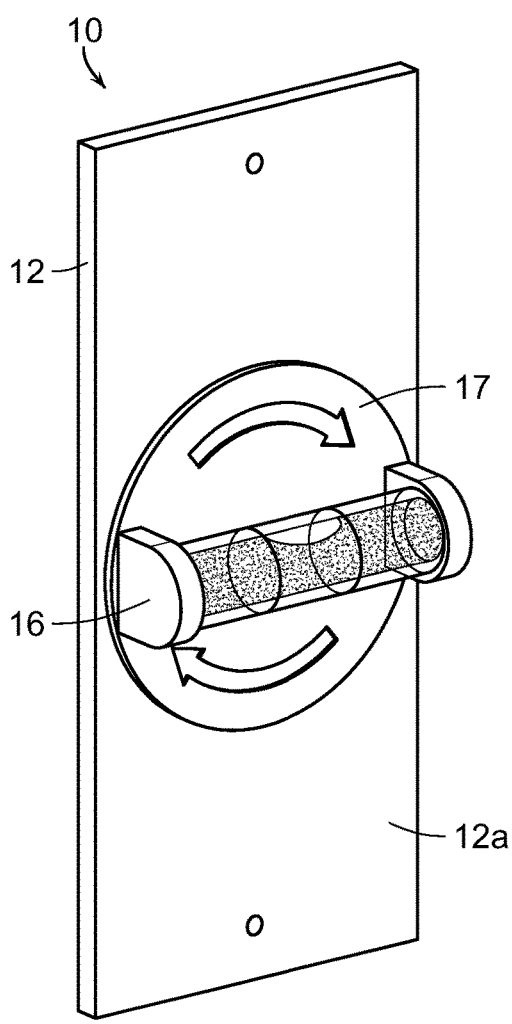
FIG. 3A is a front perspective view of an alternate preferred embodiment of the leveling device for the mounting system of the present invention.
Figure 3B:
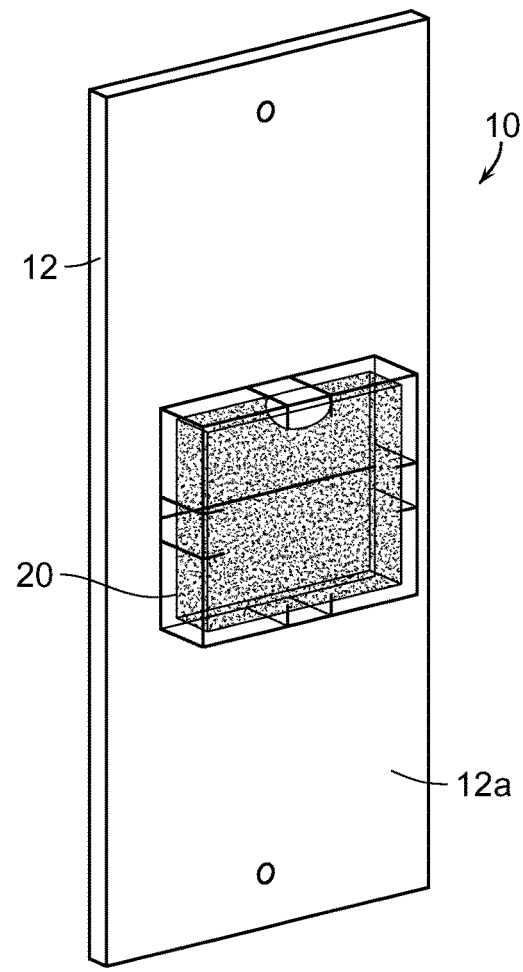
FIG. 3B is a front perspective view of an alternate preferred embodiment of the leveling device for the mounting system of the present invention.

As shown in FIG. 2, the bubble levels 16, 18 may be positioned on a fixed platform 15 on the front surface 12a. As shown in FIGS. 3 and 3A, a single bubble level 16 may be positioned on a pivotable platform 17 that can be turned between vertical or horizontal orientations. Such pivotable platform 17 removes the need to have two bubble levels. Yet another embodiment of the leveling device 10 includes a square bubble level 20 (FIG. 3B) that can provide leveling measurement in both horizontal and vertical orientations with a single bubble level.

Figure 5:
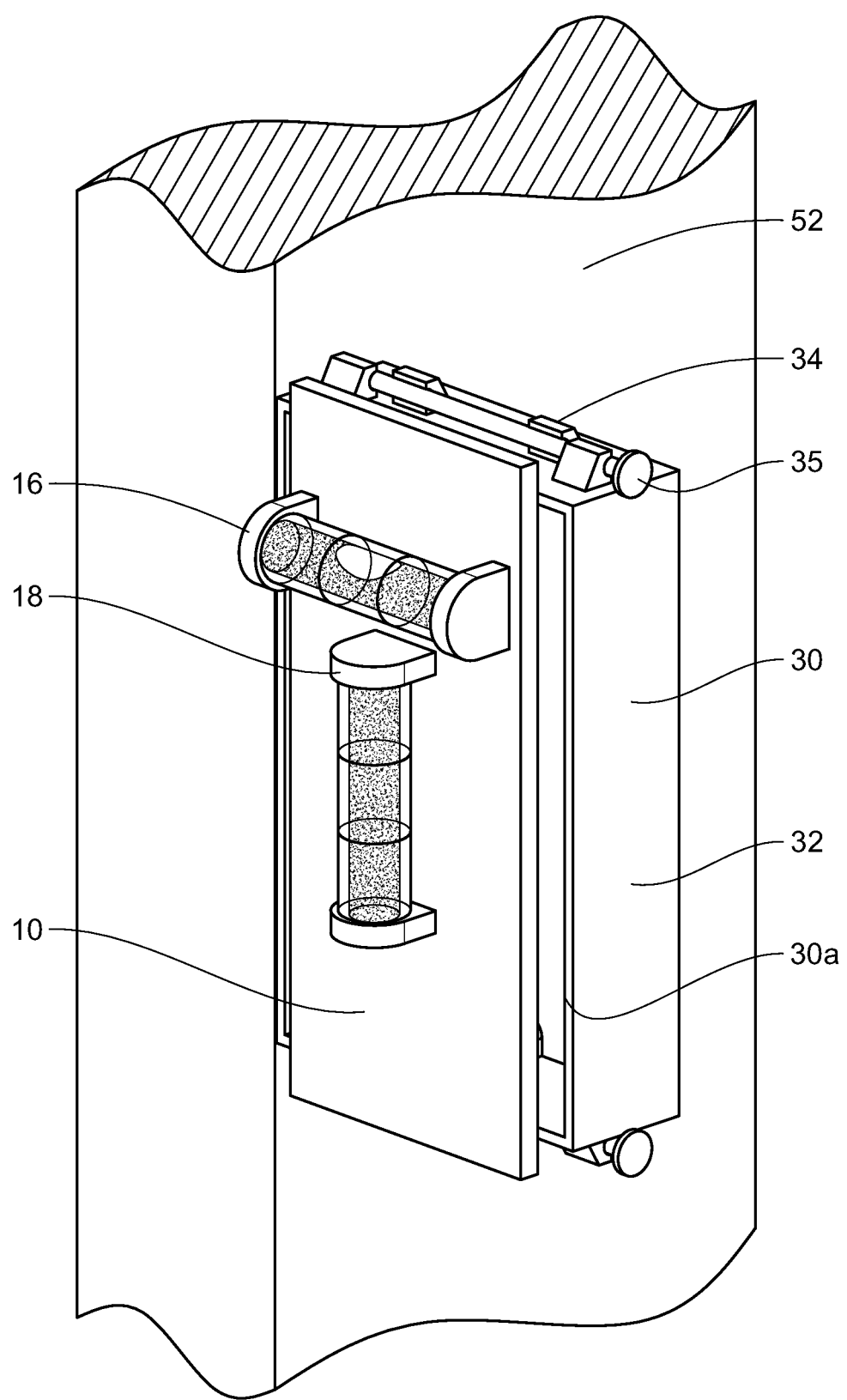
FIG. 5 is an environmental view of the leveling device for the mounting system of the present invention in conjunction with an electrical ring mounted in a wall stud.
Figure 5A:
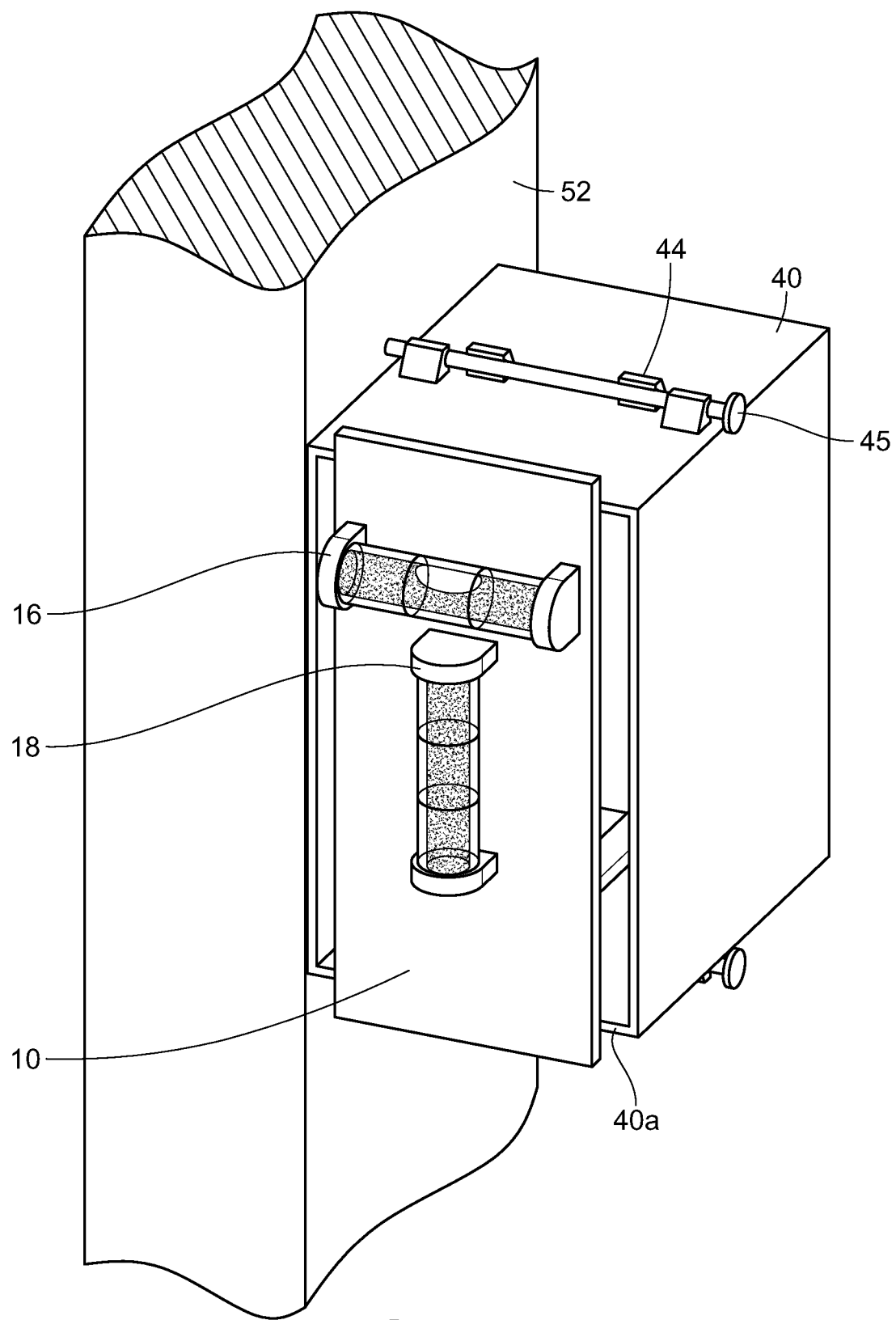
FIG. 5A is an environmental view of the leveling device for the mounting system of the present invention in conjunction with an electrical box mounted on a wall stud.

FIGS. 5 and 5A illustrate the use of a levelling device 10 in conjunction with an electrical ring 30 (FIG. 5) or an electrical box 40 (FIG. 5A). The electrical ring 30 illustrated in FIG. 5 has a generally vertical elongated rectangular body 32 configured for supporting a single electrical component, i.e., switch, plug, outlet, or other electrical component. Such electrical ring 30 configured for a single electrical component is sometimes referred to as a "single-gang" or "one-gang" ring. The electrical ring 30 may be configured for multiple components, i.e., two-gang, three-gang, four-gang, etc. A two-gang ring would be generally square. A three-gang or more ring would be a generally horizontally elongated rectangle.

Figure 7:
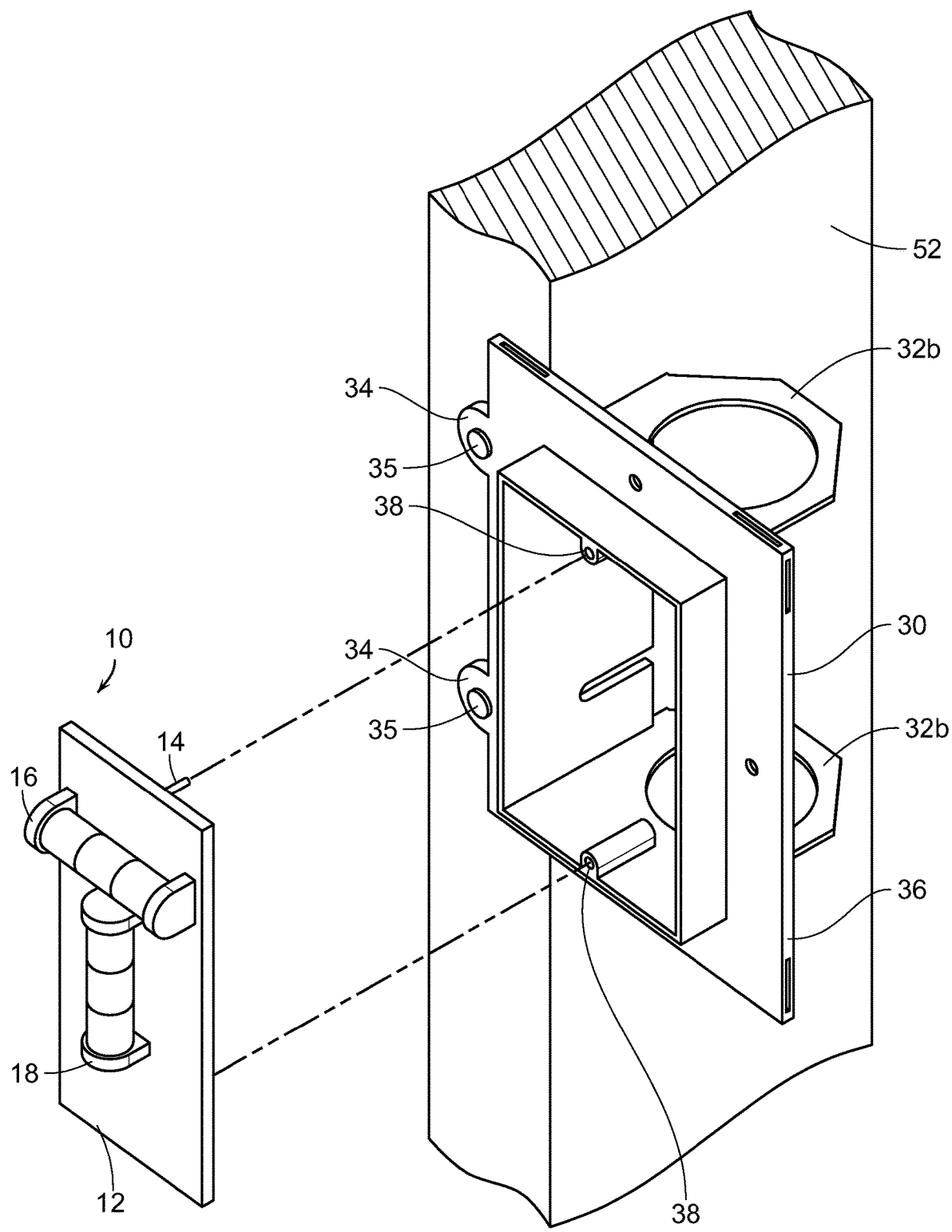
FIG. 7 is a partial exploded view of an alternate embodiment of an electrical ring and level device used in the mounting system of the present invention.
Figure 7A:
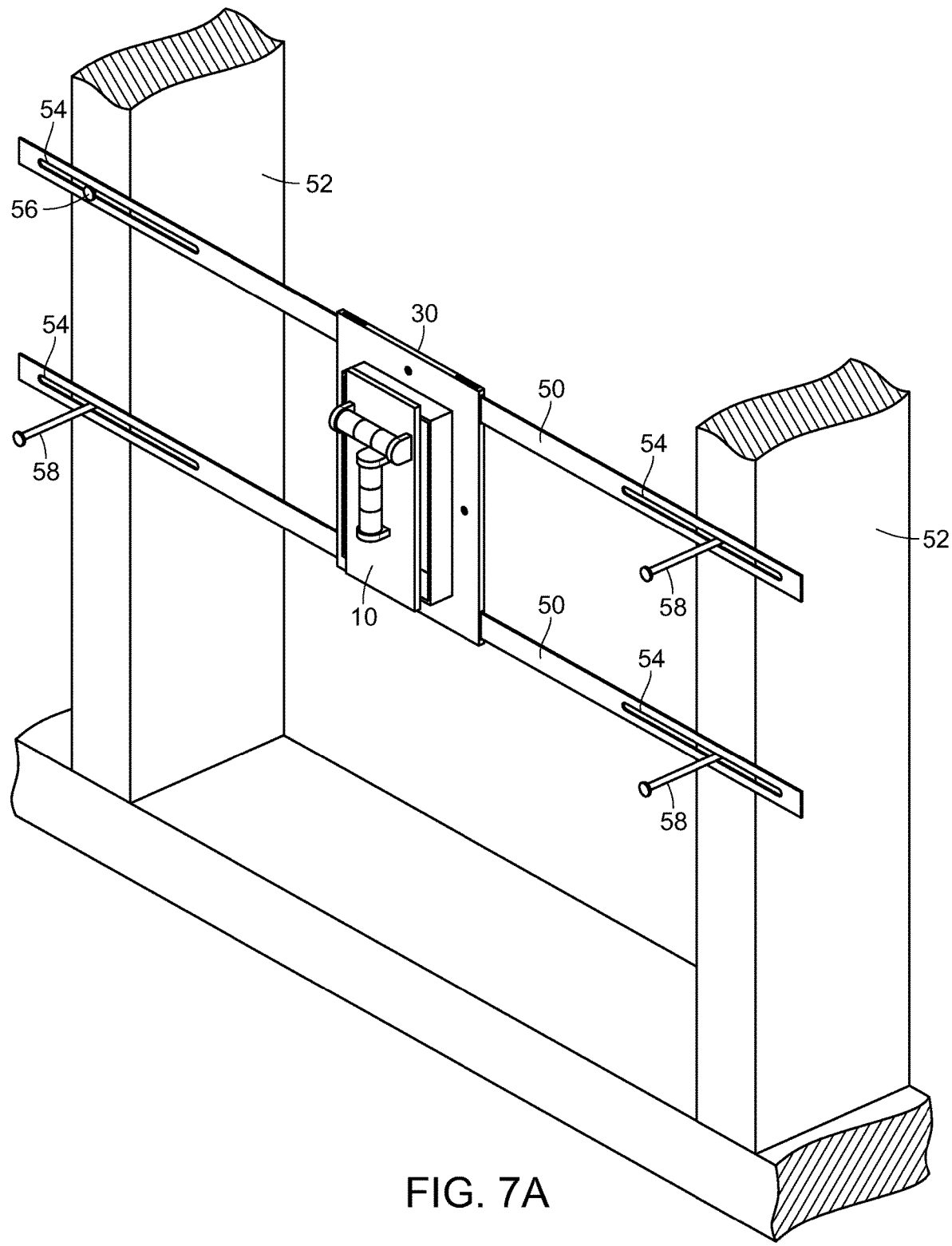
FIG. 7A is an environmental view of the leveling device used in the mounting system of the present invention in conjunction with an electrical ring mounted on cross-bars.
Figure 7B:
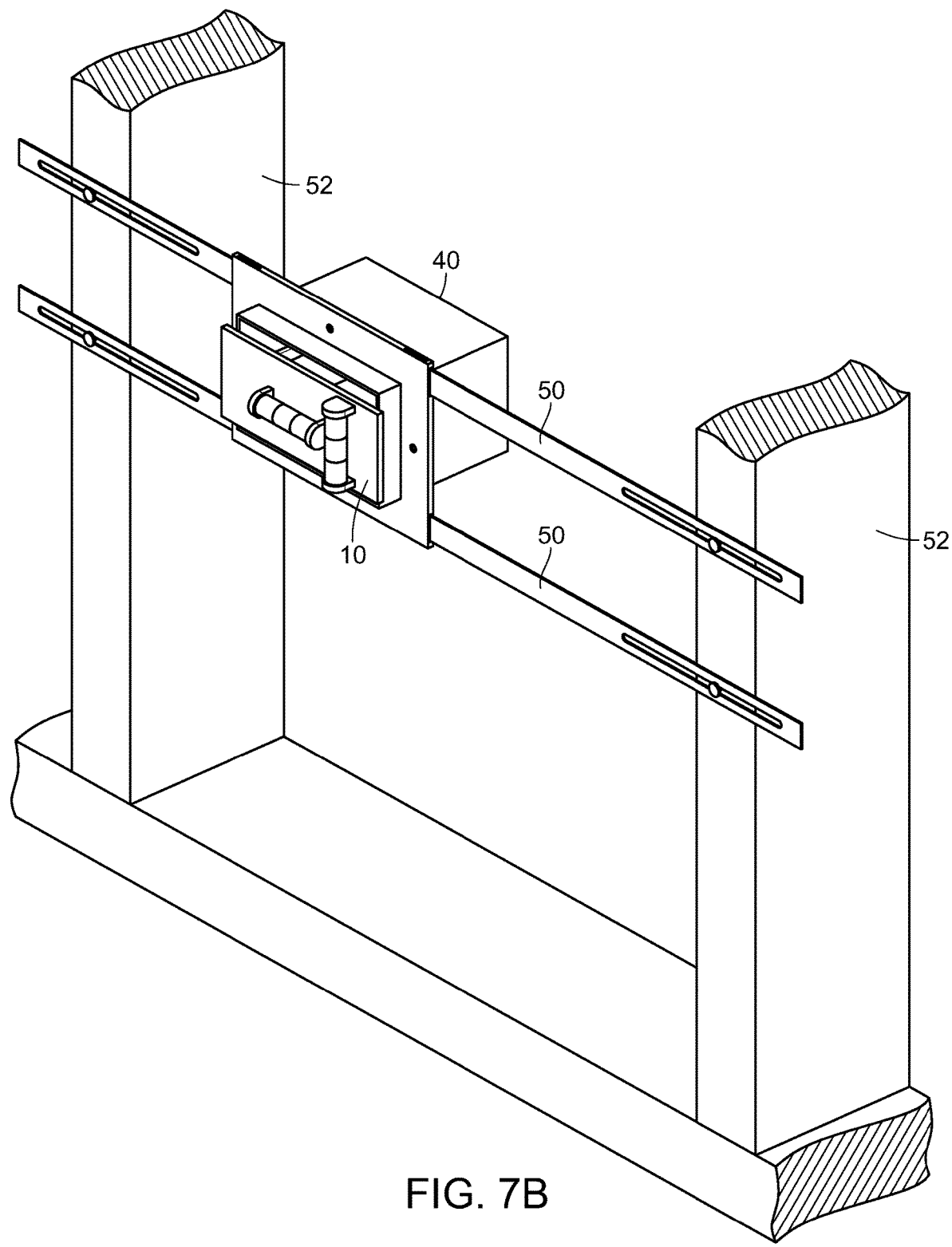
FIG. 7B is an environmental view of the leveling device used in the mounting system of the present invention in conjunction with an electrical ring mounted on cross-bars.

The electrical box 40 illustrated in FIG. 5A has a generally vertical elongated rectangular body 42 and is similar to the electrical ring 30 in almost every respect except that it has an enclosed back. Both ring 30 and box 40 include attachment supports 34, 44 at top and bottom edges that are designed to work in conjunction with fasteners 35, 45, including nails or screws. Other variations of the ring 30 and box 40 may have the attachment supports 34, 44 in other positions, as on one side or the other. (FIG. 7)

Figure 5B:
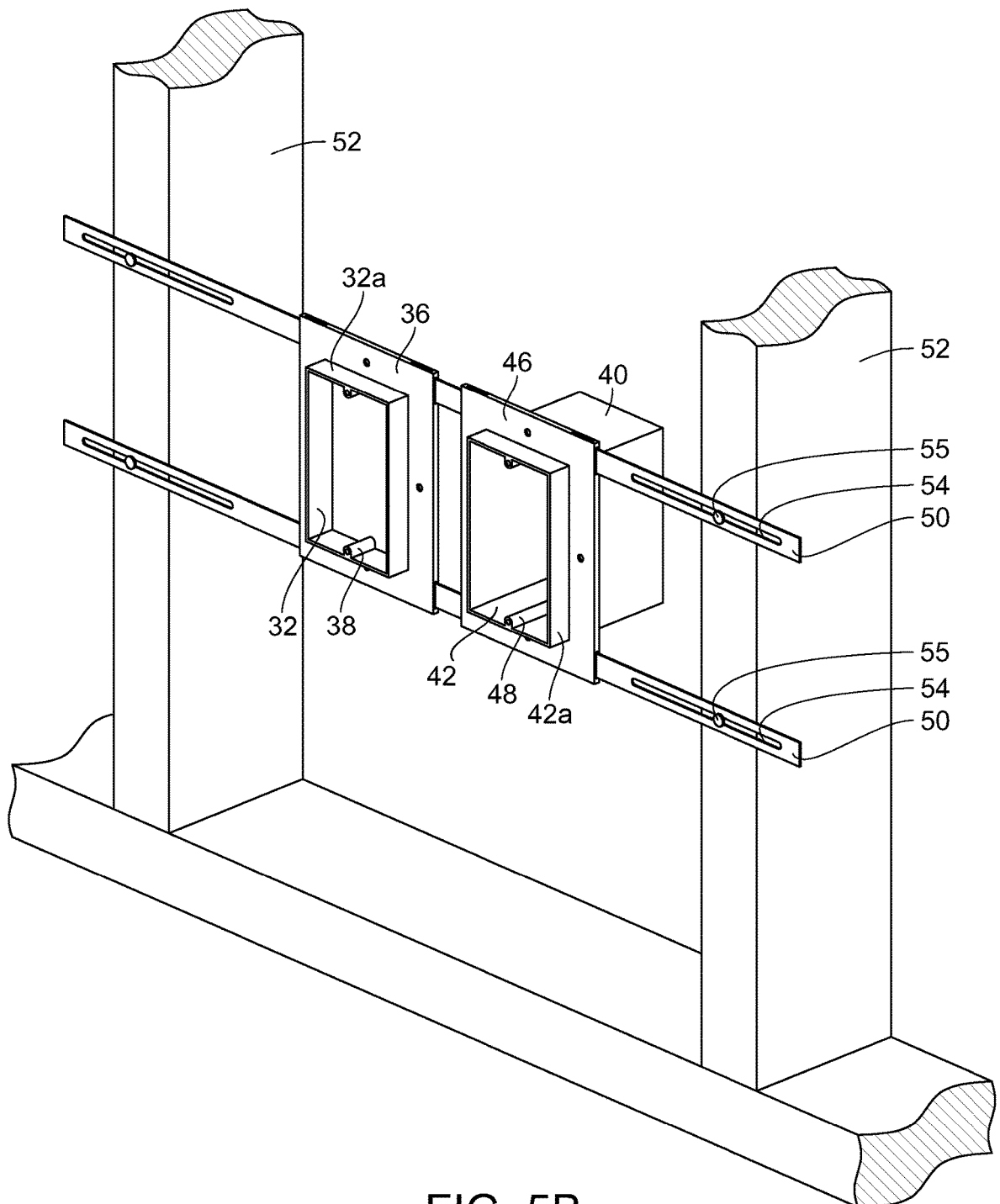
FIG. 5B is an environmental view of an electrical ring and an electrical box installed on cross-bars between two wall studs according to the mounting system of the present invention.

FIG. 5B illustrates alternate variations of the ring 30 and box 40, both of which are configured to work in conjunction with cross-stud braces 50. The cross-stud braces 50 are elongated straps configured to span the space between wall studs 52. The braces 50 include attachment slots 54 at opposite ends of the elongated strap. The attachment slots 54 preferably comprise elongated opening allowing for a fastener 55 to secure the braces 50 to the wall studs 52 at variable positions to account for possible variation in spacing.

Figure 6:
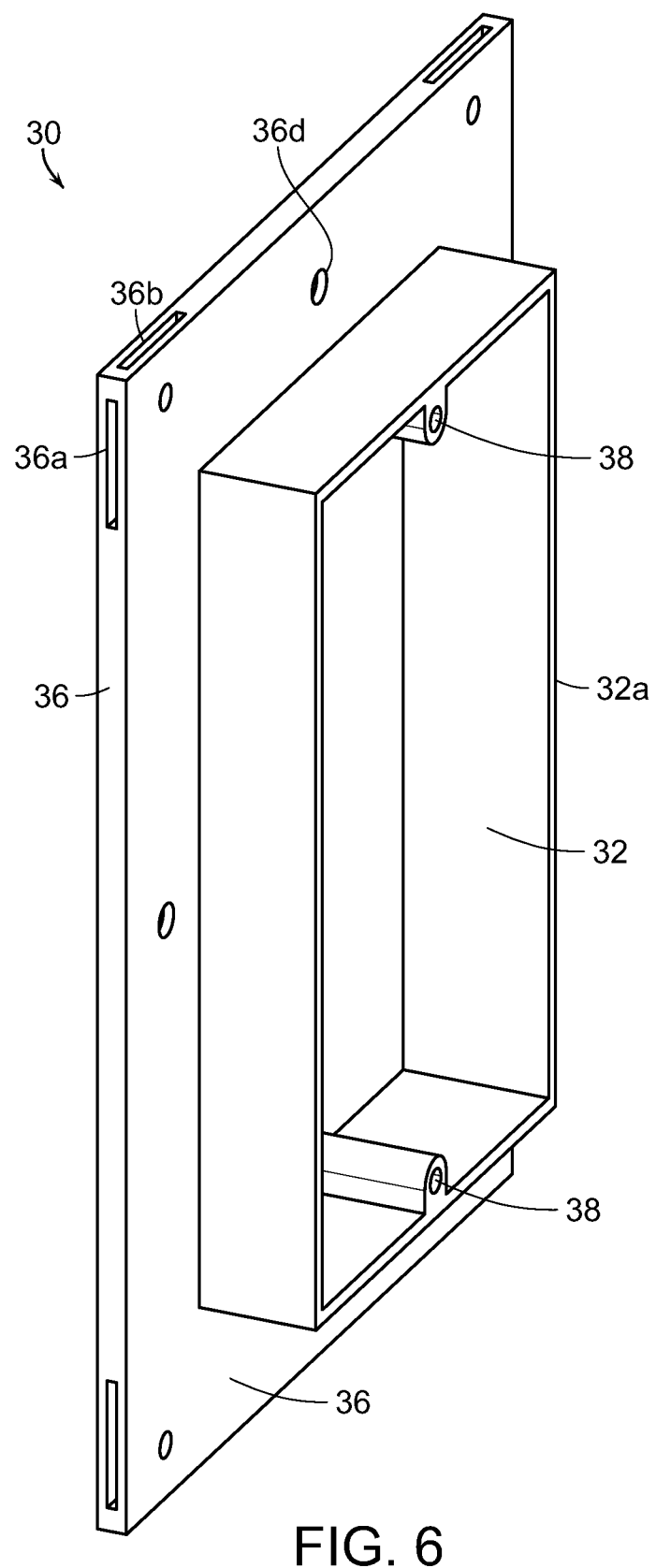
FIG. 6 is a front perspective view of an electrical ring used in the mounting system of the present invention.
Figure 6A:
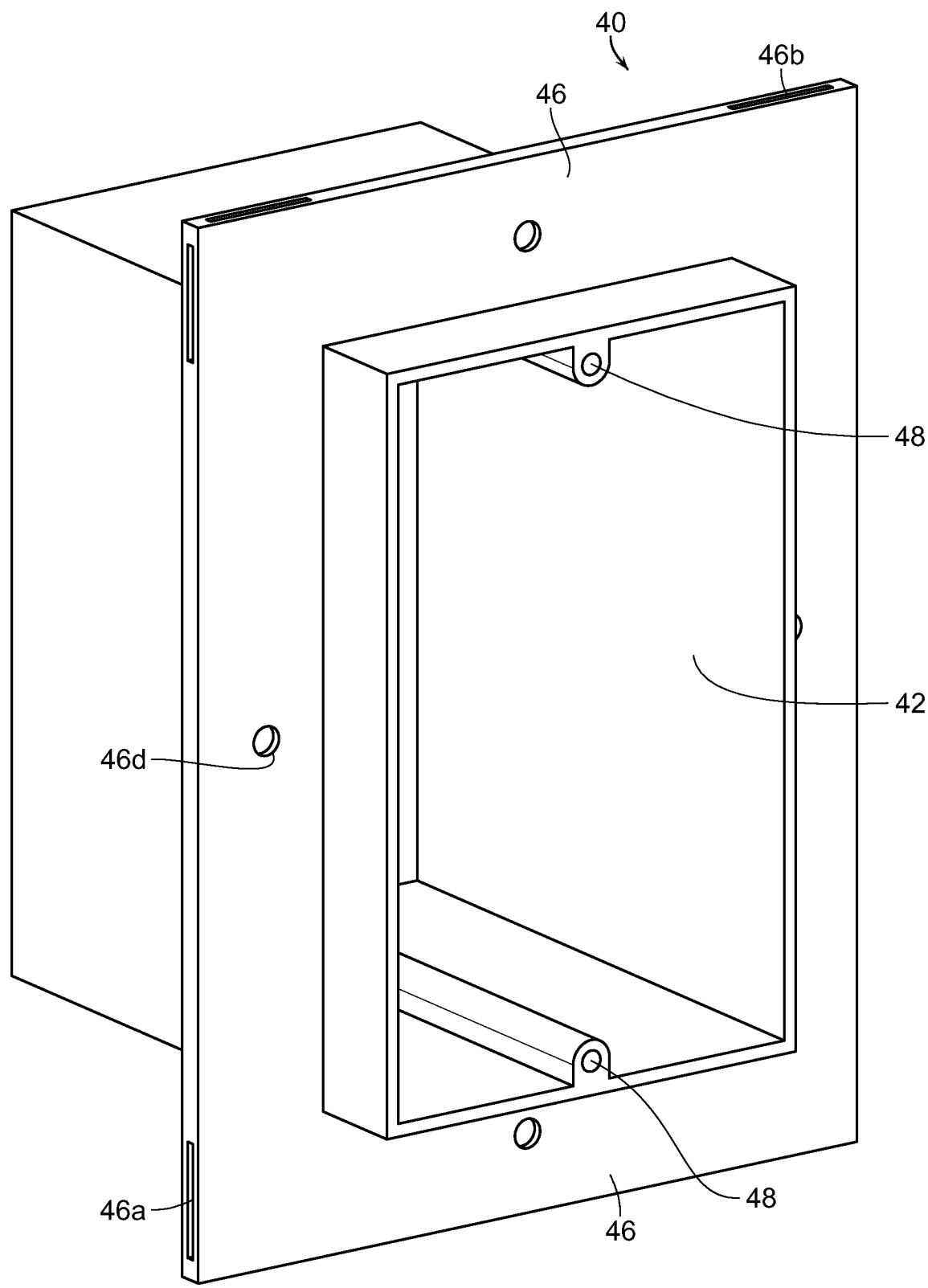
FIG. 6A is a front perspective view of an electrical box used in the mounting system of the present invention.
Figure 6B:
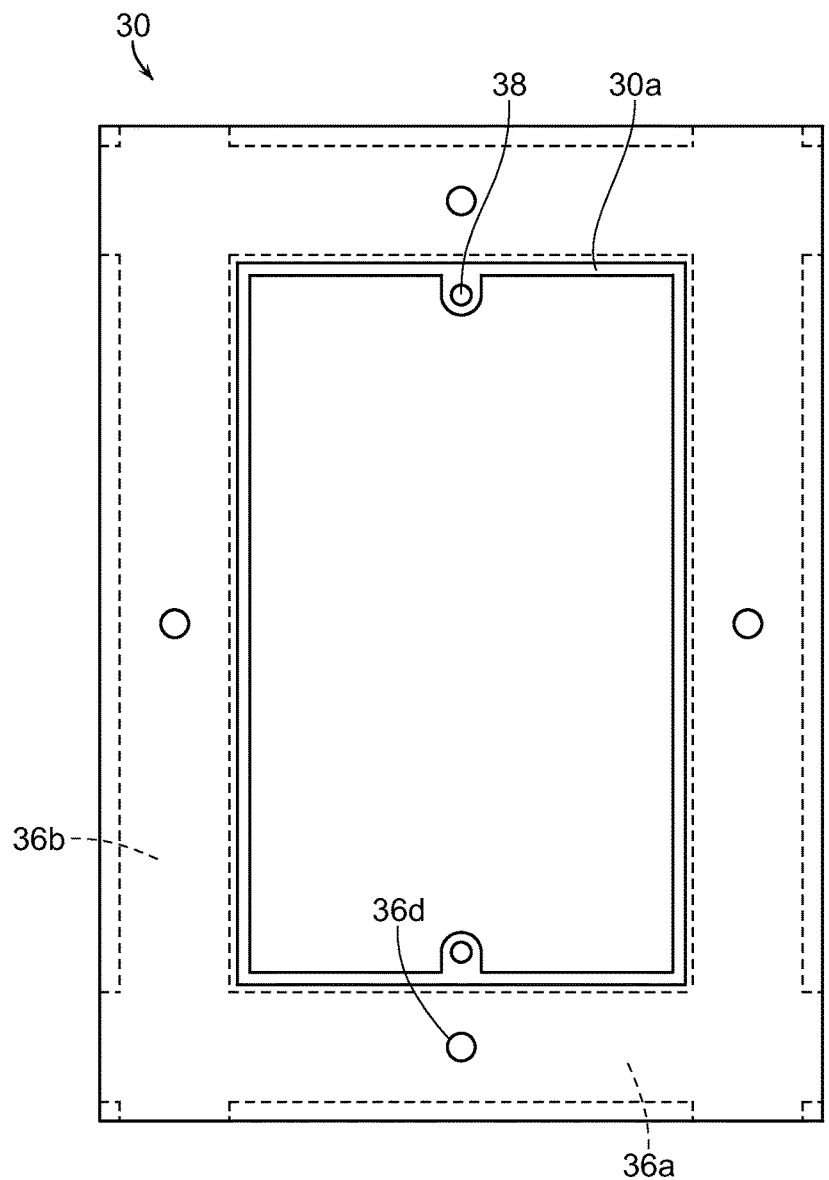
FIG. 6B is a front view of an electrical ring used in the mounting system of the present invention.
Figure 6C:
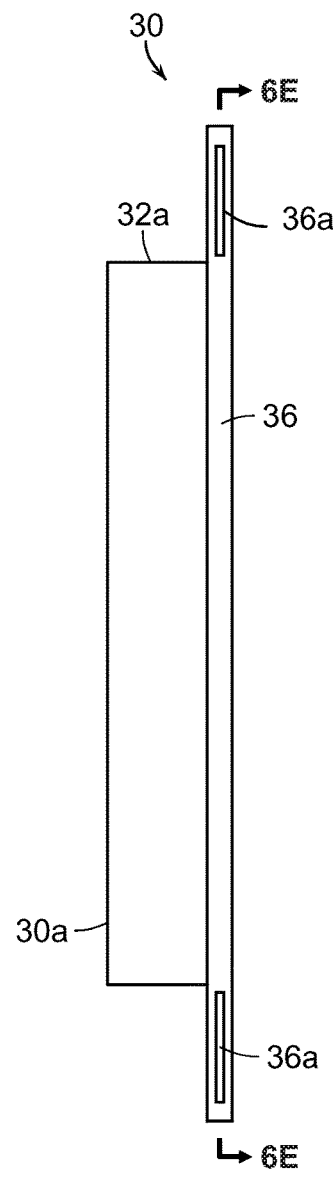
FIG. 6C is a side view of an electrical ring used in the mounting system of the present invention.
Figure 6D:
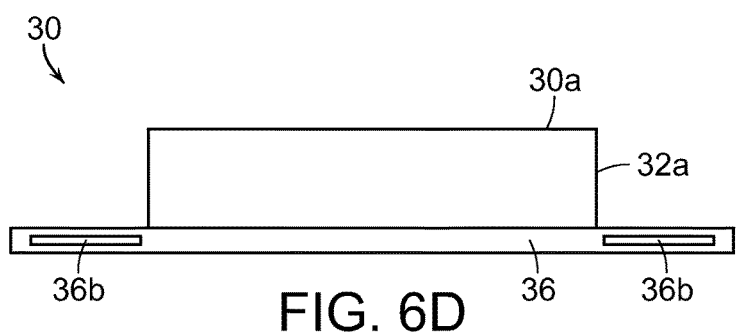
FIG. 6D is a bottom view of an electrical ring used in the mounting system of the present invention.
Figure 6E:
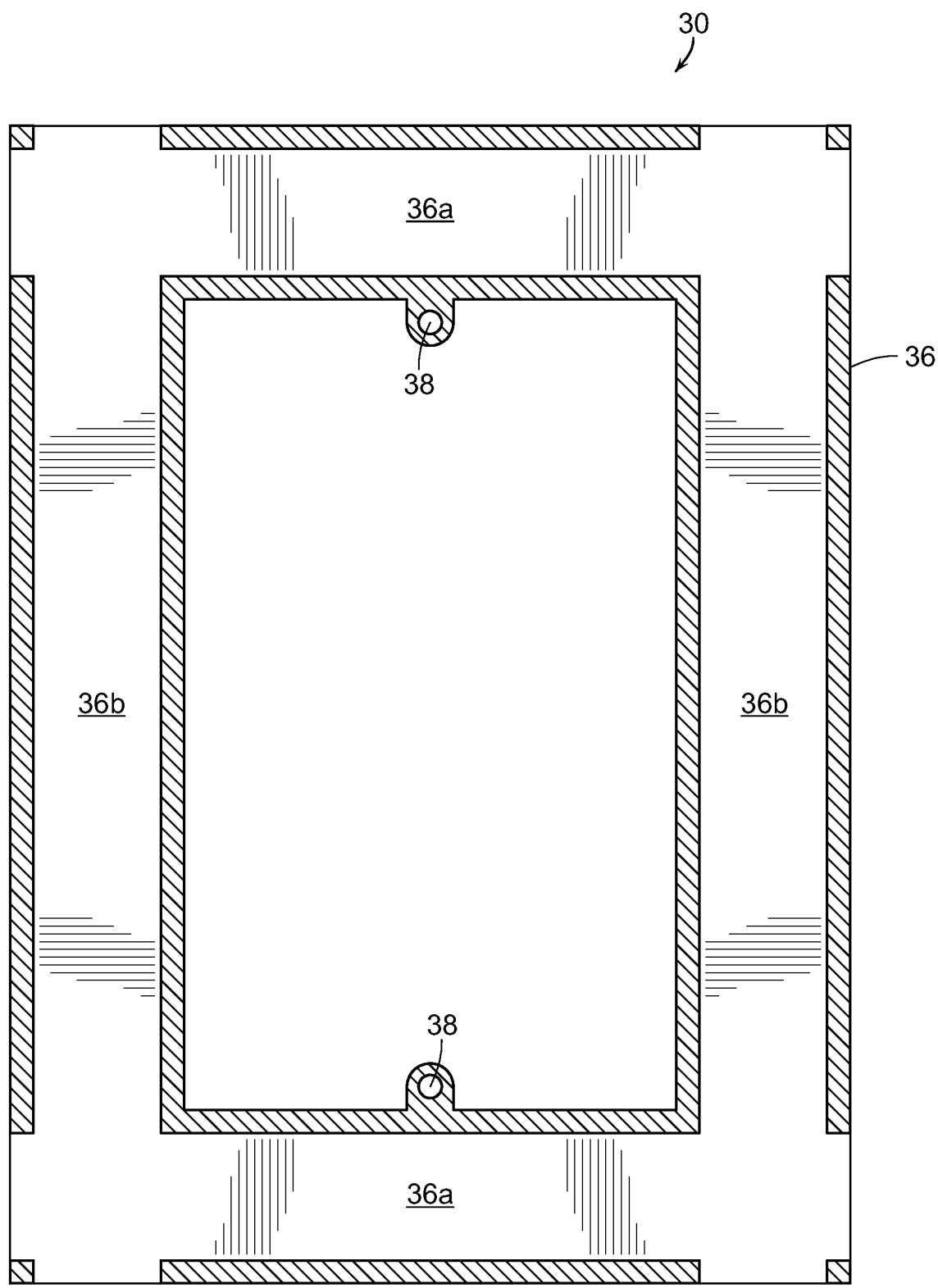
FIG. 6E is a cross-sectional view of an electrical ring used in the mounting system taken along line 6E-6E of FIG. 6C.

When used with braces 50, each of the ring 30 and box 40 include a flange 36, 46, around the perimeter of the body 32, 42, as shown in FIGS. 6-6E. The flange 36, 46 is preferably spaced a minimum distance rearward of a front face 30a, 40a of the ring 30 or box 40 such that a front portion of the body forms a lip or wall 32a, 42a that would protrude partially or entirely through drywall or other walling material (not shown) that might enclose the wall studs 52. The flanges 36, 46 are preferably hollow having horizontal pass-throughs 36a, 46a on opposite top and bottom edges and vertical pass-throughs 36b, 46b on opposite left and right side edges.

Figure 6F:
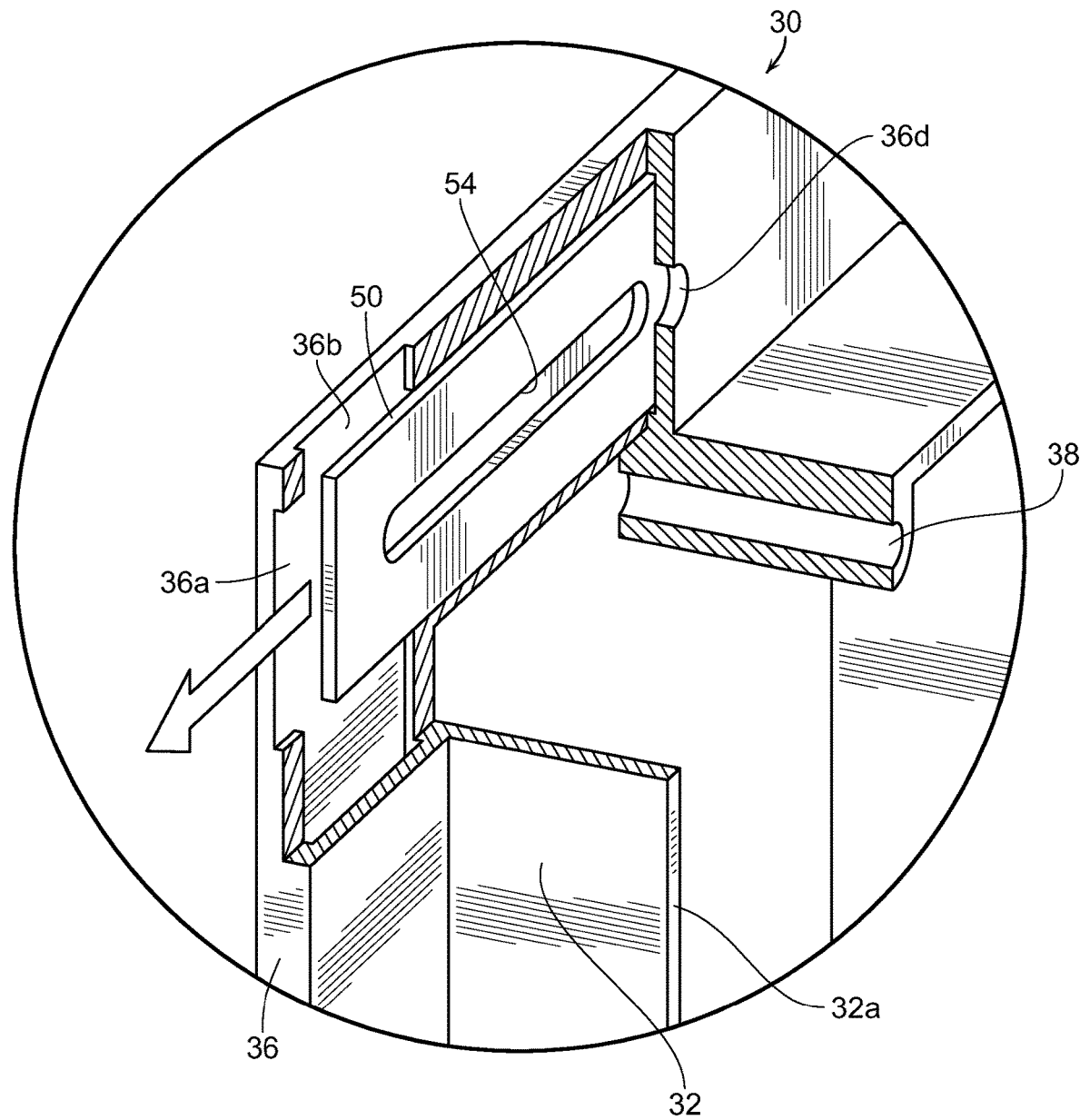
FIG. 6F is a partial-cutaway view of an electrical ring used in the mounting system of the present invention.
Figure 6G:
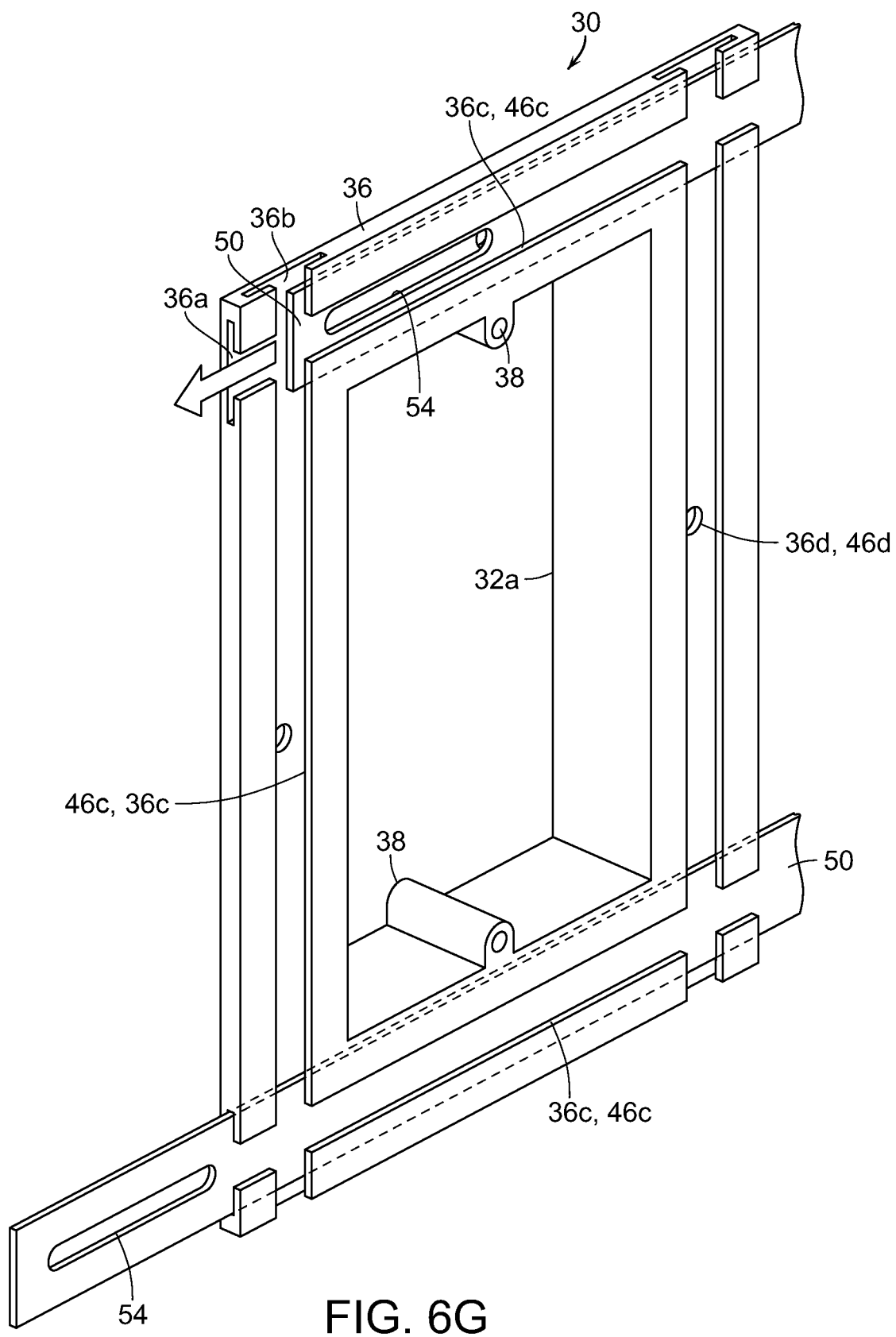
FIG. 6G is a rear perspective view of an alternate embodiment of an electrical ring used in the mounting system of the present invention.

These pass-throughs 36a, 36b, 46a, 46b allow for the ring 30 and box 40 to be hung on one or more braces 50 between adjacent wall studs 52. Depending on the use of the horizontal pass-throughs 36a, 46a or the vertical pass-throughs 36b, 46b, the ring 30 or box 40 may be hung horizontally or vertically on the braces 50. FIGS. 6F and 6G show the braces 50 traversing the pass-throughs 36a, 36b, 46a, 46b. FIG. 6G shows a variation on the pass-throughs 36a, 36b, 46a, 46b that have an open back slot 36c, 46c. While FIG. 6G only illustrates ring 30 and not box 40, the slots 46c and securing port 46d from box 40 are shown in this drawing for simplicity. The function and position of the slots 46c and ports 46d in the box 40 are the same as the function and position of slots 36c and ports 36d in the ring 30. These slots may selectively permit the ring 30 or box 40 to be hung on the braces 50 after the same have already been secured to the studs 52. Each pass-through 36a, 36b, 46a, 46b preferably also includes a securing port 36d, 46d on a front face of the flange 36, 46 to as to fix the position of the ring 30 and box 40 on the brace 50 once installed. The securing port 36d, 46d may receive a screw or other fastener to exert pressure against the brace 50.

Each ring 30 and box 40 preferably also includes securing holes 38, 48. The securing holes 38, 48 are preferably threaded and positioned to receive screws or other fasteners associated with an electrical component. As shown in FIG. 7 the posts 14 of the leveling device 10 are configured to be inserted into the securing holes 38, 48. When the posts 14 are inserted into the holes 38, 48, as shown in FIGS. 5, 5A, 7A, and 7B, the bubble levels 16, 18 are positioned so at to indicate proper leveling of the ring 30 or box 40 whether positioned horizontally or vertically. With the various embodiments of the bubble levels, i.e., the pivoting platform 17 or the square bubble level 20, the leveling device 10 may perform the same function with a single bubble level.

FIG. 7 also shows a variation on the ring 30 that includes one or more wire braces 32b extending rearward of the body 32. The wire braces 32b are configured to keep electrical wires or shielded wire close to the rear of the body 32. The box 40 would preferably include knock-outs or similar openings as are known in prior art boxes.

When used in conjunction with braces 50, the leveling device 10 should be used in conjunction with the ring 30 or box 40 prior to securing the braces 50 at all positions. Specifically, as shown in FIG. 7, a first position 56 of one brace 50 should be secured, with the other positions 58 being secured in a preferred order to fix the ring 30 or box 40 in a level position as indicated by the leveling device 10. An installer than then remove the leveling device 10 such that the securing holes 38, 48 are open to receive the fasteners from the appropriate switch, outlet, plug or other electrical component. Because the leveling device 10 directly indicates that the securing holes 38, 48 are level, an installer can have greater certainty that the electrical component will be properly aligned when installed.

Figure 8:
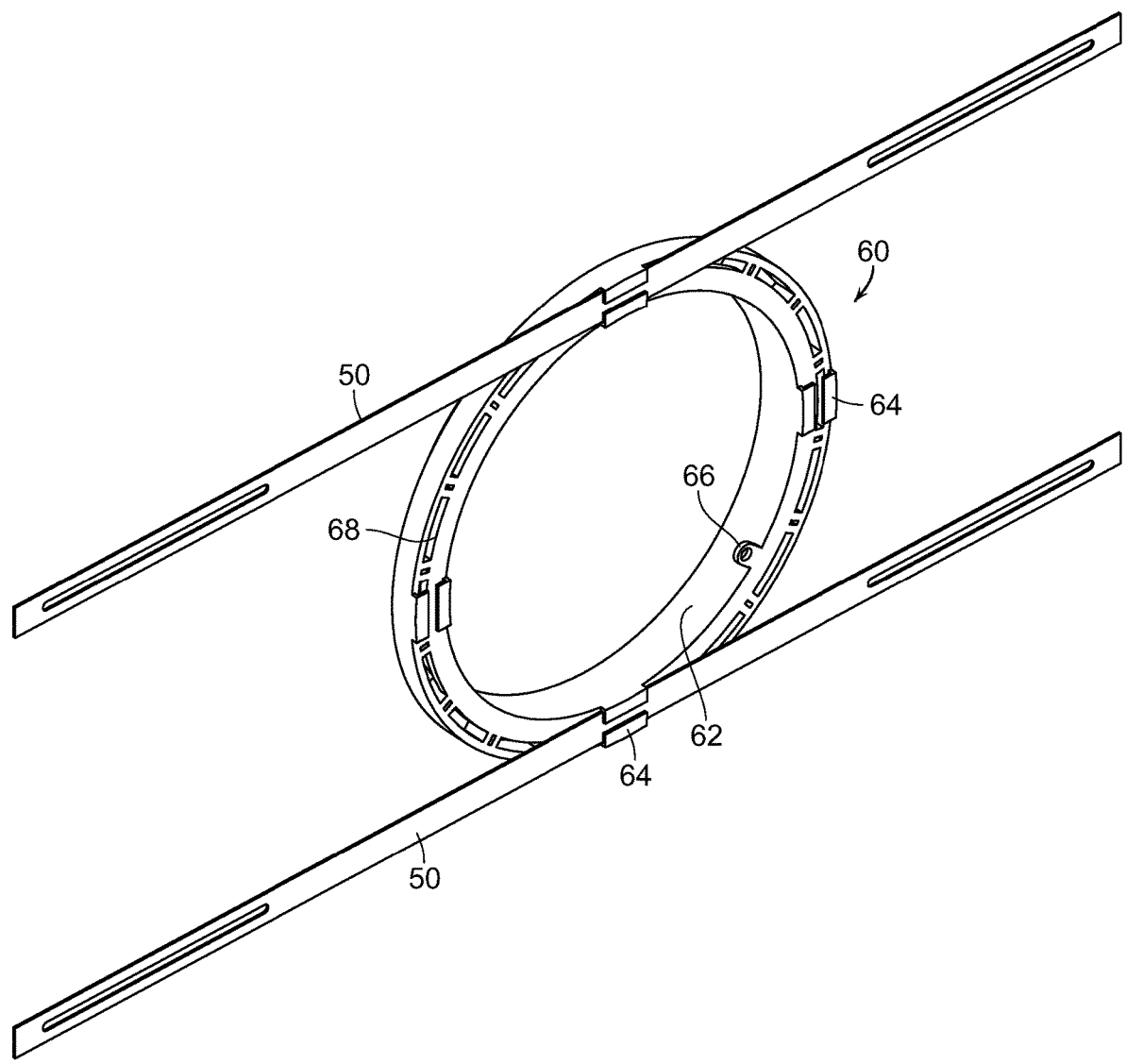
FIG. 8 is a rear perspective view of a speaker ring used in the mounting system of the present invention.
Figure 8A:
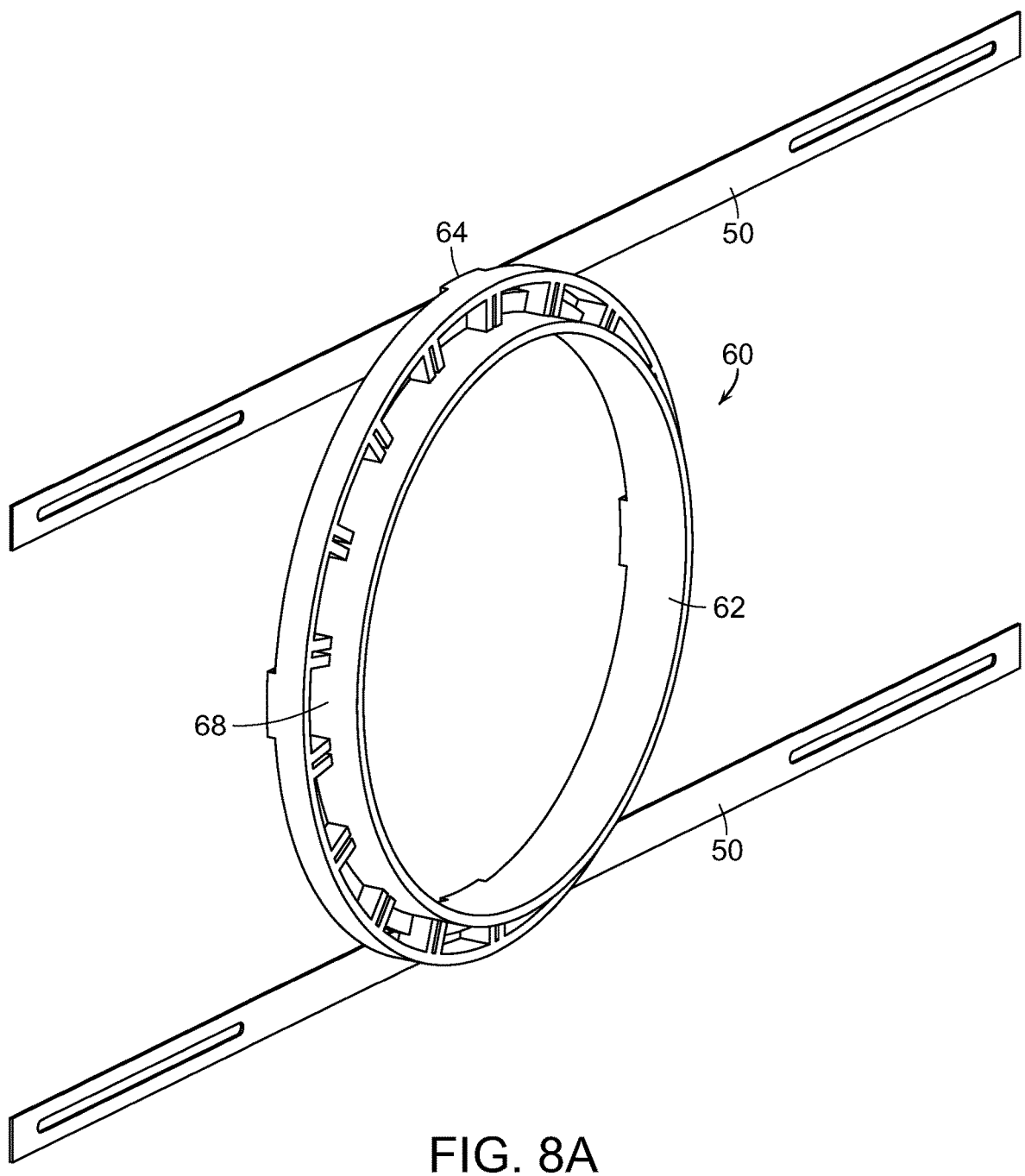
FIG. 8A is a front perspective view of a speaker ring used in the mounting system of the present invention.

FIGS. 8 and 8A illustrate a variation system utilizing the braces 50. In this variation, the ring 30 or box 40 is replaced by a speaker ring 60 that is generally circular or other appropriate shape. Because the speaker ring 60 is circular, it is not necessary to use the leveling device 10 in this variation of the system to confirm the degree of leveling during installation. The speaker ring 60 preferably has a body 62 with at least two, but preferably four pass-through brackets 64 for mounting on the braces 50 as described above. The speaker ring 60 preferably includes at least one wire support 66. A plurality of slots 68 are provided around the perimeter of the speaker ring 60 so as to permit attachment of a speaker or other electrical component.

Although several embodiments have been described in detail for purposes of illustration, various modifications may be made without departing from the scope and spirit of the invention.

What is claimed is:

1. A leveling device for use in installing electrical boxes and rings comprising:
   a substrate having a generally planar elongated shape with a front surface and a rear surface;
   a bubble level device attached to the front surface, wherein the bubble level device is mounted on a pivoting platform, configured to adjust the bubble level device between a perpendicular or parallel orientation relative to the elongated dimension of the substrate; and
   a pair of positioning pins extending from the rear surface, wherein the pins are disposed proximate to opposite ends of an elongated dimension of the substrate and configured to be inserted into gang screw holes on the electrical boxes and rings.

2. The leveling device of claim 1, wherein the bubble level device comprises a first bubble level disposed perpendicular to the elongated dimension of the substrate.

3. The leveling device of claim 2, wherein the bubble level device further comprises a second bubble level disposed parallel to the elongated dimension of the substrate.

4. The leveling device of claim 1, wherein the pair of positioning pins are threaded and rotatably attached to the substrate.

5. The leveling device of claim 1, wherein the pair of positioning pins are selectively removable from the substrate and replaceable.

6. A process for installing an electrical box or ring to a wall stud, comprising the steps of:
   providing a leveling device according to claim 1;
   inserting the pair of positioning pins on the leveling device to a pair of gang holes on the electrical box or ring;
   positioning the bubble level device such that it is perpendicular to a vertical axis extending between the pair of gang holes;
   attaching the electrical box to the wall stud in a position where the bubble level device indicates that the vertical axis is perpendicular to a structural horizontal; and
   removing the leveling device from the electrical box or ring.

7. The process for installing an electrical box or ring to a wall stud of claim 6, wherein the attaching step comprises securing a first attachment support on the electrical box or ring to the wall stud; measuring the bubble level device so as to determine that the vertical axis is perpendicular to the structural horizontal; and securing a second attachment support on the electrical box or ring to the wall stud while the vertical axis is perpendicular to the structural horizontal.

8. The process for installing an electrical box or ring to a wall stud of claim 6, wherein the attaching step comprises inserting a first cross-stud brace into a first pass-through slot in a flange on a first side of the electrical box or ring; inserting a second cross-stud brace into a second pass-through in a flange on a second side of the electrical box or ring.

9. The process for installing an electrical box or ring to a wall stud of claim 8, wherein the attaching step further comprises securing a first end of the first cross-stud brace to the wall stud; measuring the bubble level device so as to determine that the vertical axis is perpendicular to the structural horizontal; securing a second end of the first cross-stud brace to an adjacent wall stud while the vertical axis is perpendicular to the structural horizontal; securing a first end of the second cross-stud brace to the wall stud; and securing a second end of the second cross-stud brace to the adjacent wall stud.

10. A system for installing an electrical box or ring between two adjacent wall studs, comprising:
    a leveling device comprising a substrate having a generally planar elongated shape with a front surface and a rear surface, a bubble level device attached to the front surface, and a pair of positioning pins extending from the rear surface, wherein the pins are disposed proximate to opposite ends of an elongated dimension of the substrate and configured to be inserted into gang screw holes on the electrical box or ring;
    the electrical box or ring having a flange disposed around a perimeter thereof, with a first pass-through slot in the flange on a first side of the electrical box or ring and a second pass-through slot in the flange on a second side of the electrical box or ring opposite the first side;
    a first cross-stud brace configured to slidingly extend through the first pass-through slot and having attachment slots at opposite ends thereof, each of the attachment slots configured for fastening to one of the two adjacent wall studs; and
    a second cross-stud brace configured to slidingly extend through the second pass-through slot and having attachment slots at opposite ends thereof, each of the attachment slots configured for fastening to one of the two adjacent wall studs.

11. The system of claim 10, further comprising a first set screw in the flange, whereby the first cross-stud brace is fixed in position relative to the electrical box or ring.

12. The system of claim 11, further comprising a second set screw in the flange, whereby the second cross-stud brace is fixed in position relative to the electrical box or ring.

13. The system of claim 10, wherein the first pass-through slot comprises a partially open back and the second pass-through slot comprises a partially open back.

* * * * *